United States Patent
Milligan et al.

(10) Patent No.: US 7,392,591 B2
(45) Date of Patent: Jul. 1, 2008

(54) LIGHT LINE GENERATING ASSEMBLY

(75) Inventors: Michael A. Milligan, Gananoque (CA); Robert J. B. Hobden, Kingston (CA); Oleksiy P. Sergyeyenko, Brockville (CA)

(73) Assignee: Black and Decker, Newark, DE (US)

( * ) Notice: Subject to any disclaimer, the term of this patent is extended or adjusted under 35 U.S.C. 154(b) by 0 days.

(21) Appl. No.: 11/559,547

(22) Filed: Nov. 14, 2006

(65) Prior Publication Data

US 2007/0139925 A1 Jun. 21, 2007

Related U.S. Application Data

(60) Provisional application No. 60/736,825, filed on Nov. 15, 2005.

(51) Int. Cl.
*G01C 15/00* (2006.01)
(52) U.S. Cl. ............................... 33/286; 33/281; 33/291
(58) Field of Classification Search .................. 33/286, 33/227, 276, 277, 278, 281, 282, 283, 285, 33/290, 291, DIG. 21
See application file for complete search history.

(56) References Cited

U.S. PATENT DOCUMENTS

| | | | |
|---|---|---|---|
| 4,099,118 A | 7/1978 | Franklin et al. | |
| 4,464,622 A | 8/1984 | Franklin | |
| 5,012,585 A * | 5/1991 | DiMaggio | 33/286 |
| 5,144,487 A | 9/1992 | Hersey | |
| 5,400,514 A | 3/1995 | Imbrie et al. | |
| 5,539,990 A * | 7/1996 | Le | 33/283 |
| 5,724,744 A | 3/1998 | Bozzo | |
| 5,949,810 A | 9/1999 | Star et al. | |
| 6,009,630 A | 1/2000 | Rando | |
| 6,384,420 B1 | 5/2002 | Doriguzzi Bozzo | |
| 6,453,568 B1 | 9/2002 | Hymer | |
| 6,502,319 B1 | 1/2003 | Goodrich et al. | |
| 6,532,676 B2 | 3/2003 | Cunningham | |
| 6,536,122 B2 | 3/2003 | Tamamura | |
| 6,694,629 B2 * | 2/2004 | Goodrich | 33/286 |
| 6,796,040 B2 | 9/2004 | Ohtomo et al. | |
| 6,871,408 B2 | 3/2005 | Malard et al. | |
| 6,914,930 B2 | 7/2005 | Raskin et al. | |
| 6,964,106 B2 * | 11/2005 | Sergyeyenko et al. | 33/286 |
| 7,013,570 B2 | 3/2006 | Levine et al. | |
| 7,031,367 B2 | 4/2006 | Marshall et al. | |
| 7,059,057 B2 | 6/2006 | Raskin et al. | |
| 2002/0166249 A1 | 11/2002 | Liao | |
| 2007/0056173 A1 * | 3/2007 | Burry et al. | 33/286 |

* cited by examiner

*Primary Examiner*—Christopher W Fulton
(74) *Attorney, Agent, or Firm*—Edell, Shapiro & Finnan, LLC

(57) ABSTRACT

An assembly for generating light lines on a surface is disclosed. The assembly may include a first housing coupled to a second housing. The first housing includes the first housing may include a first light source and a second light source capable of generating intersecting light lines on the surface. The first housing, moreover, may be repositioned with respect to the second housing to reorient the light lines on the surface. The assembly may further include a pendulum assembly operable to self-level the light lines to create substantially vertical (plumb) and/or horizontal lines over a generally vertical surface such as a wall.

24 Claims, 13 Drawing Sheets

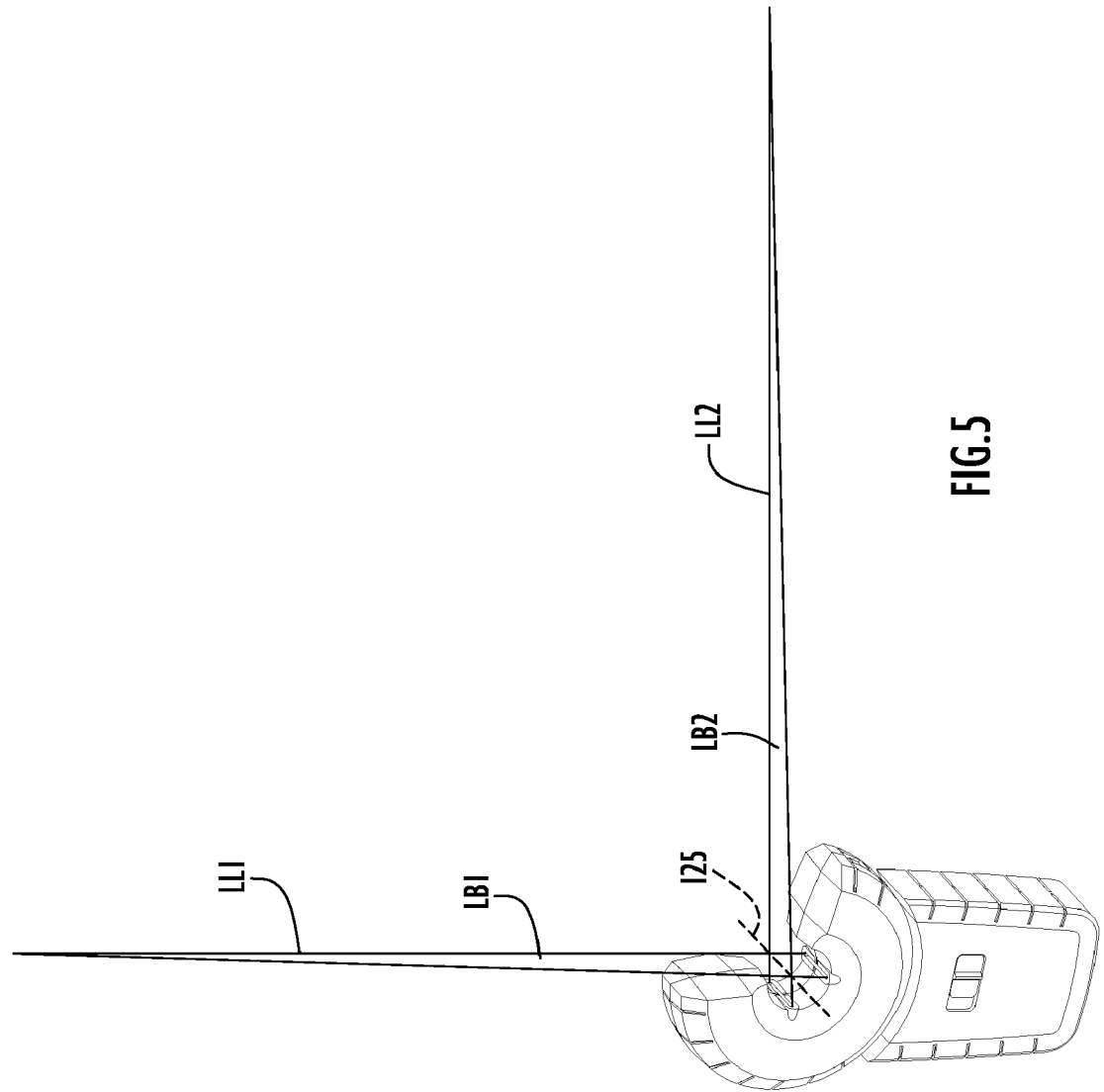

LIGHT LINE GENERATING ASSEMBLY

CROSS REFRENCE TO RELATED APPLICATIONS

This application claims priority to U.S. Provisional Patent Application No. 60/736,825 filed 15 Nov. 2005 and entitled "Self-Leveling, Intersecting Laser and Protractor", the disclosure of which is hereby incorporated by reference in its entirety.

FIELD OF THE INVENTION

The present invention relates to a light line generating assembly and, in particular, to a self-leveling, laser level device including a repositionable line generating unit.

BACKGROUND OF THE INVENTION

Alignment of surfaces is a perennial problem in a variety of fields, ranging from construction to interior decorating. Proper alignment is necessary to ensure that walls are perpendicular to a floor, or otherwise plumb. Laser level devices are often used in construction to produce a plane of light that serves as a reference for various projects. Laser level devices save considerable time during the initial layout of a construction project as compared to other tools such as beam levels, chalk lines, or torpedo levels. Some examples of projects where laser level devices are useful include laying tile, hanging drywall, mounting cabinets, installing counter tops, and building outdoor decks.

SUMMARY

An assembly for generating light lines on a surface is disclosed. The assembly may include a first housing coupled to a second housing. The first housing may include a first light source and a second light source capable of generating intersecting light lines on the surface. The first housing, moreover, may be repositioned with respect to the second housing to reorient the light lines on the surface. In particular, the first hosing may be rotated about horizontal and/or vertical axes. The assembly may further include a pendulum assembly operable to self-level the light lines to create substantially vertical (plumb) and/or horizontal lines over a generally vertical surface such as a wall.

BRIEF DESCRIPTION OF THE DRAWINGS

FIG. 4A illustrates side view of a laser barrel, with a portion of the laser barrel removed for clarity, while FIG. 4B illustrates a cross-sectional view of the laser barrel of FIG. 4A taken along lines 4B-4B.

FIG. 5 illustrates a perspective view the line generating assembly of FIG. 1A, showing the generation of light planes.

Like reference numerals have been used to identify like elements throughout this disclosure.

DETAILED DESCRIPTION OF THE INVENTION

Figure 1A:
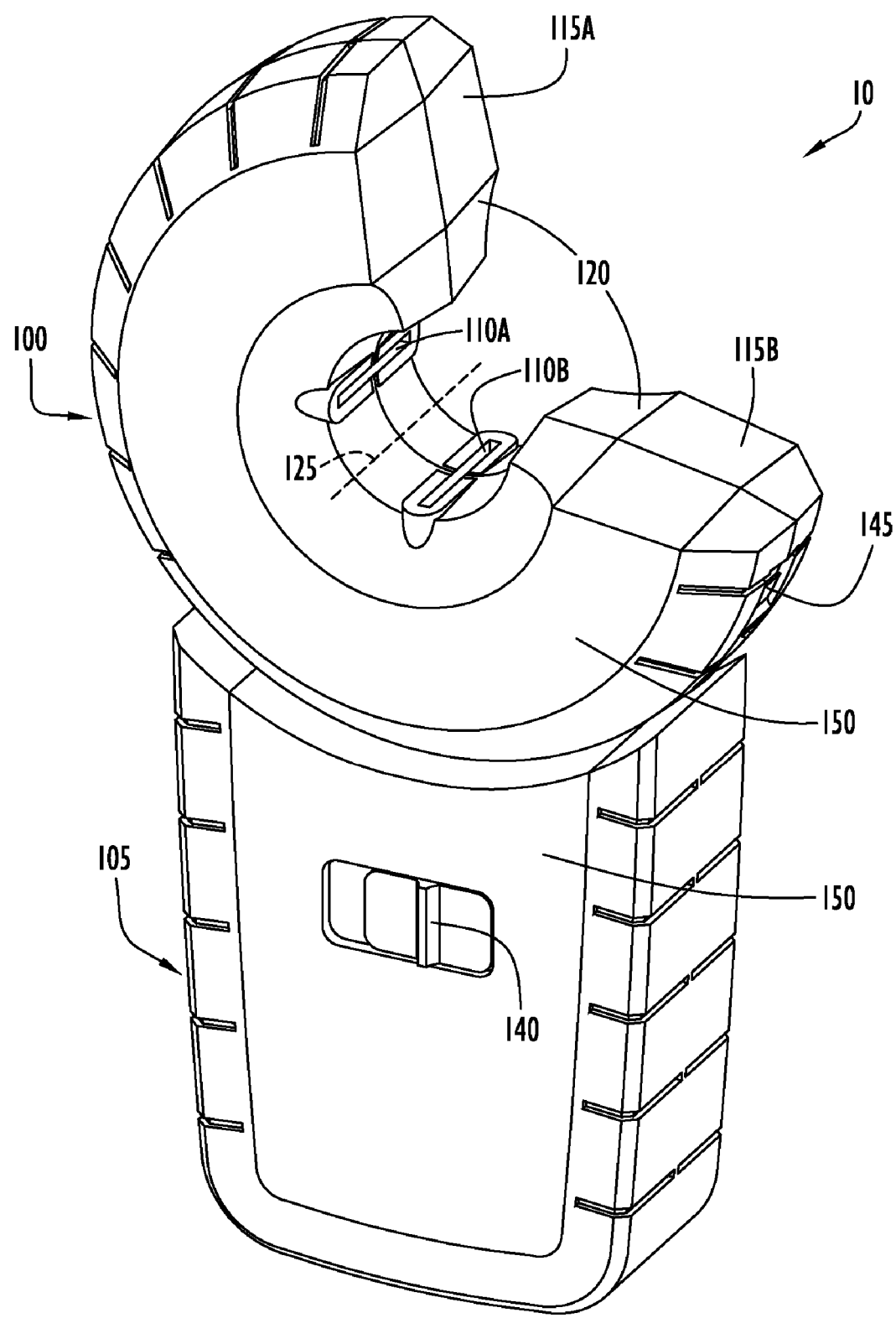
FIGS. 1A and 1B illustrate front and rear perspective views, respectively, of a line generating assembly according to an embodiment of the present invention.
Figure 1B:
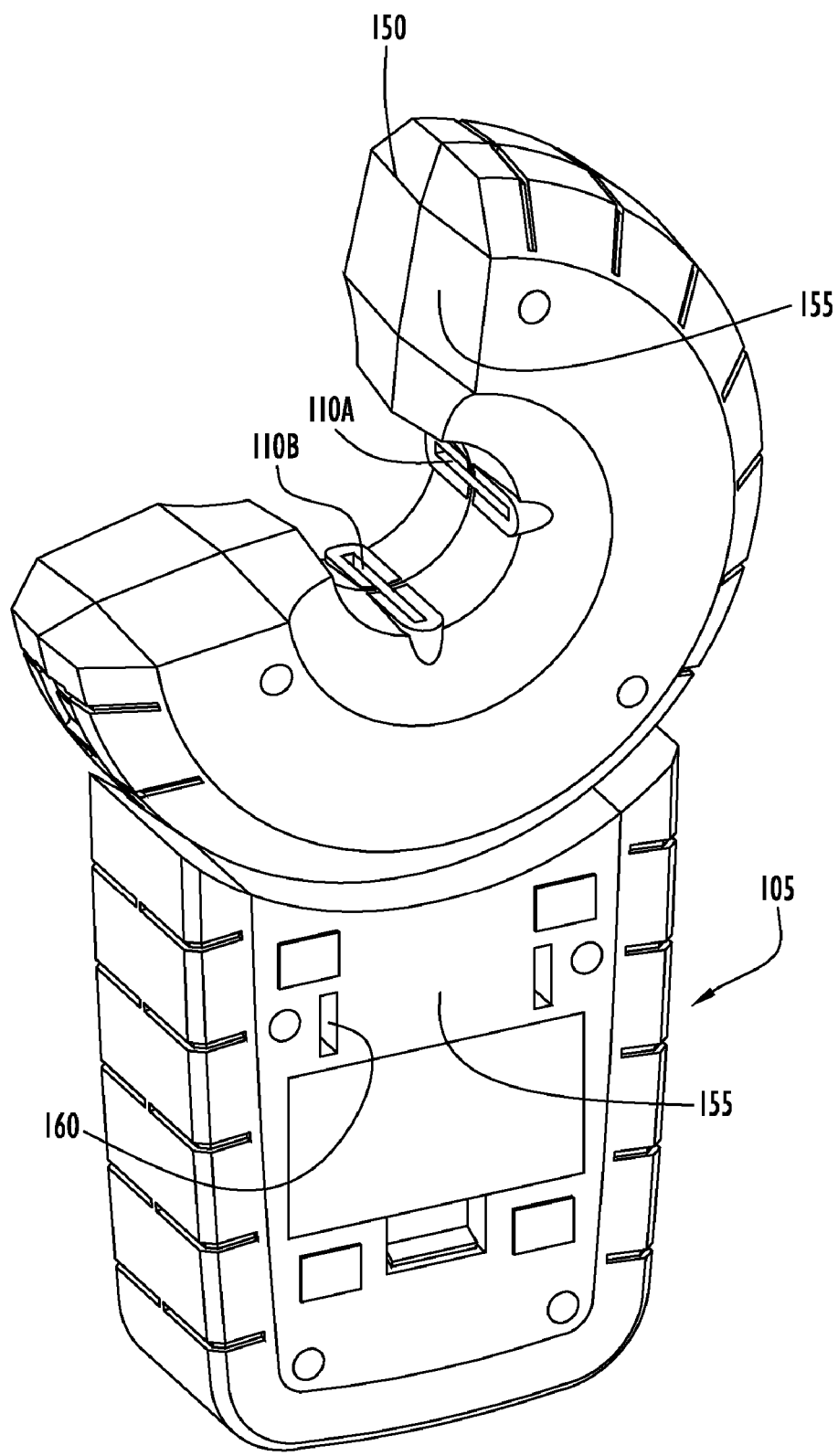

FIGS. 1A and 1B illustrate front and rear perspective views, respectively, of a light line generating assembly according to an embodiment of the present invention. Referring to FIG. 1A, the line generating assembly 10 may include a first housing or head 100 (also called a light generating unit) and a second housing or base 105. The line generating assembly 10 may be formed from a hard, impact-resistant, preferably moldable material such as a hard thermoplastic material such as ABS or polystyrene. The assembly 10 may also include a grip portion formed from soft or low durometer thermoplastic elastomer. For example, the grip portion may be adhered or overmolded to the second housing 105. Alternatively or additionally, the grip portion may be formed from "soft-touch" elastomer materials such as SANTOPRENE, KRATON, and MONOPRENE.

The first housing 100 contains a mechanism operable to generate at least one reference or light line onto a support or work surface. The shape of the first housing 100 is not particularly limited to that which is shown herein. In the embodiment illustrated in FIGS. 1A and 1B, the first housing 100 may possess a truncated ring shape. That is, the first housing 100 may possess a generally curved, C-shaped configuration with spaced apart ends 115A, 115B that define an opening 120. The angular dimensions of the opening 120 may include, but are no limited to, approximately 90°. An aperture with a central axis 125 may extend through the first housing 100.

The first housing 100 may include one or more windows operable to permit the transmission of a light beam from the first housing 100. The term window not only includes an opening with a transparent or translucent covering, but also uncovered apertures through which a beam of light may pass. By way of specific example, as shown in FIGS. 1A and 1B, the first housing 100 may include a first window 110A spaced from a second window 110B at an angle including, but not limited to, approximately 90°. With this configuration, when the first housing 100 is positioned in its normal (upright) position, the first window 110A may direct a beam of light in a generally horizontal direction, while the second window 110B may direct a beam of light in a generally vertical direction. In particular, the light beams may be transmitted from the first housing 100 such that the light beams intersect along the axis 125 of the central aperture, passing through the opening 120 of the first housing 100. In this manner, the light beams generate light lines on a support or work surface (e.g., a wall or floor), providing reference lines that permit a user to orient objects on the surface (discussed in greater detail below).

The line generating assembly 10 may further include a first actuator 140 (located, e.g., on the second housing 105) operable to control the light sources contained in the first housing, as well as a second actuator 145 (located, e.g., on the first housing 100) operable to engage the locking mechanism (each discussed in greater detail below). In addition, the line generating assembly 10 (i.e., each of the first housing 100 and the second housing 105) may be formed as a unitary structure or may be formed from a front housing portion 150 and a rear housing portion 155. The front housing portion 150 may include measurement indicia configured to indicate the angular degree of rotation of the first housing 100 with respect to the second housing 105 (not illustrated). For example, the indicia may provide protractor measurements. Alternatively, the first housing may include a protractor device similar to that disclosed in U.S. patent application Ser. No. 11/441,451, incorporated herein by reference in its entirety. Referring to FIG. 1B, the rear housing portion 155 may include slots 160 configured to receive the arms of a mounting accessory (discussed below). In still another embodiment the rear housing portion 155 may also include angle markings to measure the angle when, for example, the upper housing is rotated about a vertical axis (discussed in greater detail below).

Figure 2:
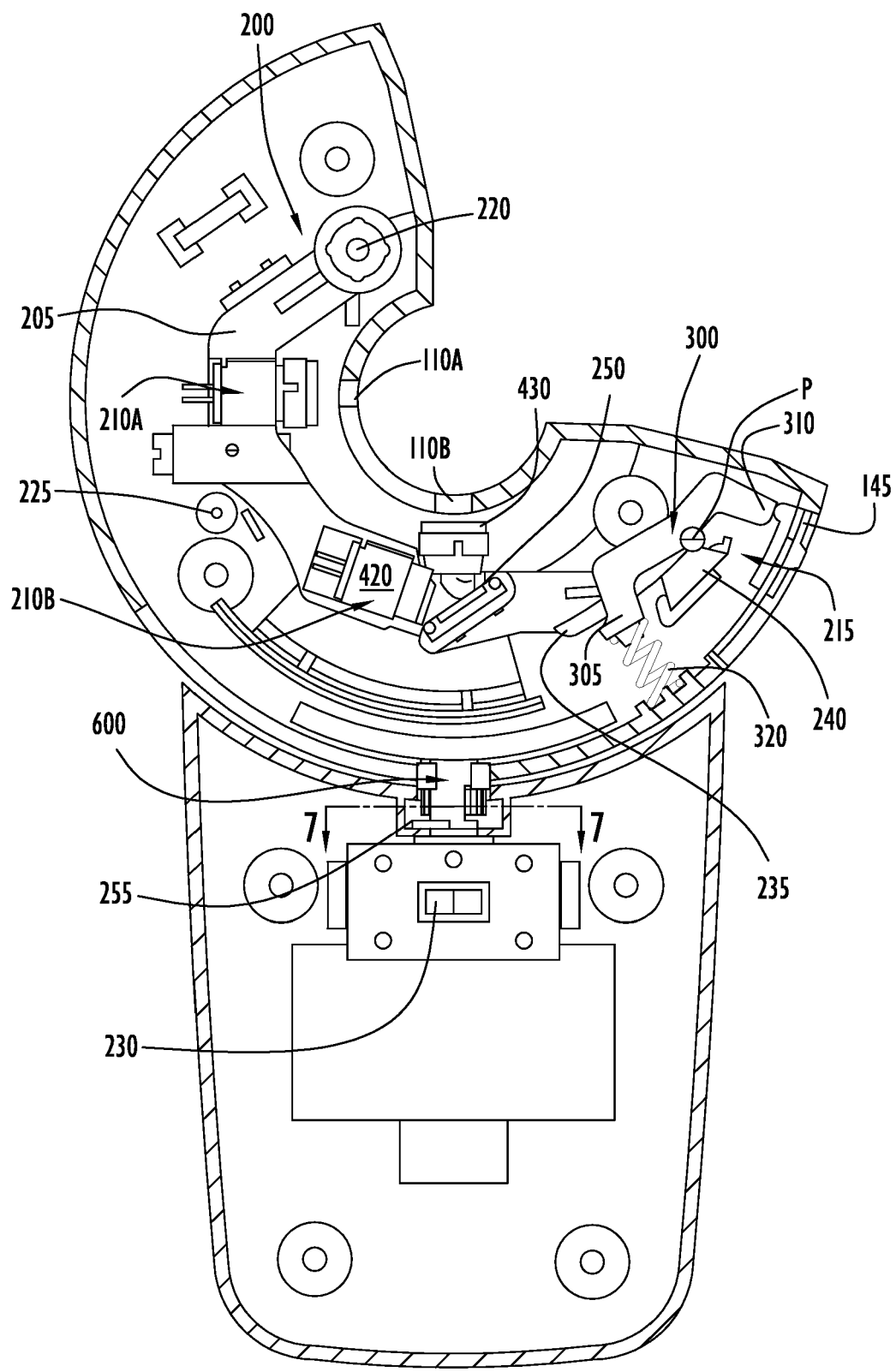
FIG. 2 illustrates a front perspective view of the line generating assembly of FIG. 1A, with the front housing portion removed for clarity.

FIG. 2 illustrates a front perspective view of the line generating assembly 10 of FIG. 1A, with the front housing portion 150 removed for clarity. The first housing 100 may further contain a pendulum assembly 200 including a pendulum 205, one or more light sources 210A, 210B, and a damping mechanism 215. The pendulum 205 may be coupled to the rear housing portion 155 such that it freely pivots within the first housing 100 (i.e., it may be pendulously suspended within the first housing 100). Specifically, the pendulum 205 may pivotally coupled to a post 220 extending from the interior surface of the rear housing portion 155. A guide member 225 may be positioned to direct and/or limit the degree and/or direction of pivot in the pendulum 205. By way of example, the pendulum 205 may swing about 12° (±6° from its normal (0°) position). One or more bearings (not shown) may optionally be provided between the pendulum 205 and the post 220 to allow for a more fluid and consistent motion.

In operation, when the line generating assembly 10 is placed against a work or support surface such as a generally vertical wall, the pendulum 205 will pivot to automatically reorient the light sources 210A, 210B such that substantially vertical (plumb) and/or horizontal lines are created. In other words, the pendulum assembly 200 is self-leveling, correcting the orientation of the light beams on the work surface even if the work surface is uneven, or even if the line generating assembly 10 is placed against the work surface in a slightly tilted orientation.

The light sources 210A, 210B may each include a device operable to generate a light beam LB such as a light plane or line. In the embodiment illustrated in FIG. 2, a first light source 210A is coupled to the pendulum 205 to direct a light beam LB through the first window 110A, while a second light source 210B is coupled to the pendulum 205 such that it directs a light beam LB through the second window 110B. The light source 210A, 210B may include, but is not limited to, a laser assembly (discussed in greater detail below). The light sources may be selectively controlled by a switch 230 in communication with the first actuator 140. For example, the switch may selectively power one or both light sources 210A, 210B.

The damping mechanism 215 is capable of decreasing the amplitude of the pendulum 205. The damping mechanism 215 may be any mechanism suitable for its described purpose (i.e., damping the motion of pendulum 205). By way of example, the curved bar 235 may be formed from electrically conductive, non-ferrous material (e.g., aluminum, zinc, copper, brass). The rear housing portion 155 may further include a magnet 240 that aligns with the curved bar 235. The curved bar 235, moreover, is formed and positioned such that a precise gap is maintained at a predetermined width when the pendulum 205 is in motion (i.e., as the pendulum swings about the post 220). The interaction between the eddy currents in curved bar 235 with the magnetic field of the magnets causes damping of the swaying motion of pendulum 205. Alternative embodiments for the damping mechanism 215 may be found in U.S. Pat. No. 5,144,487, the disclosure of which is incorporated herein by reference in its entirety.

The line generating assembly 10 may further include a calibration mechanism configured to calibrate the orientation of the pendulum 205. By way of example, the calibration mechanism may include a balance screw disposed along the pendulum 205. The calibration mechanism may be utilized to adjust the pathway of the light beam and, in particular, to allow the light sources 210A, 210B to be angularly adjusted relative to the first housing 100. In addition, at least one of the light sources 210A, 210B may be adjustable on the pendulum 205 to calibrate the light beam alignment. For example, this can be accomplished with a spring and screw mechanism.

The line generating assembly 10 of the present invention may further include a lock mechanism operable to stabilize the pendulum 205, preventing its pivotal motion. The lock mechanism may include a lock lever 300 including a first end 305 and a second end 310, as well as biasing member 320 that biases the first end 305 of the lock lever 300 against the curved bar 235 of the pendulum 205. The lock lever 300 may be pivotally coupled to the first housing 100 at a pivot point P.

Figure 3A:
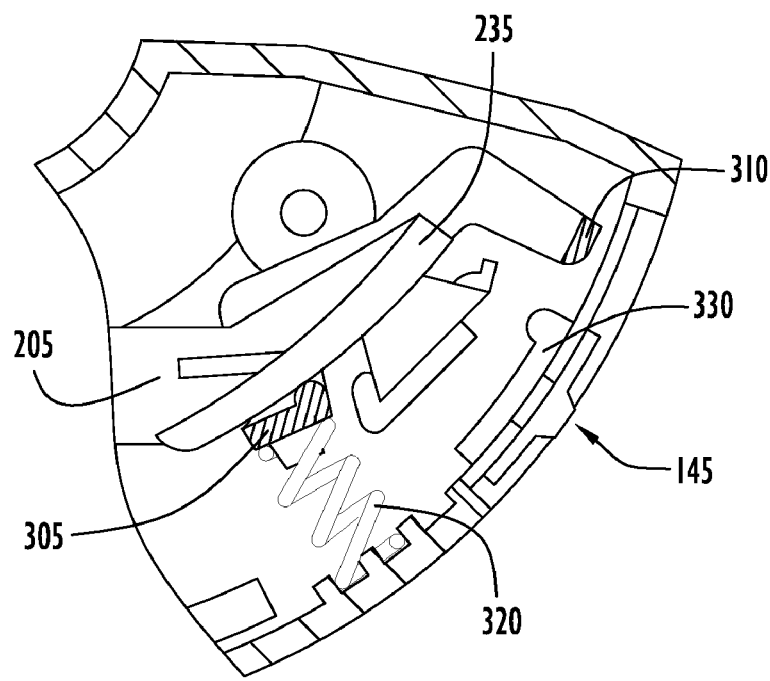
FIGS. 3A and 3B are close-up views of a pendulum locking mechanism in accordance with an embodiment of the present invention, with the front portion of the lock lever removed for clarity.
Figure 3B:
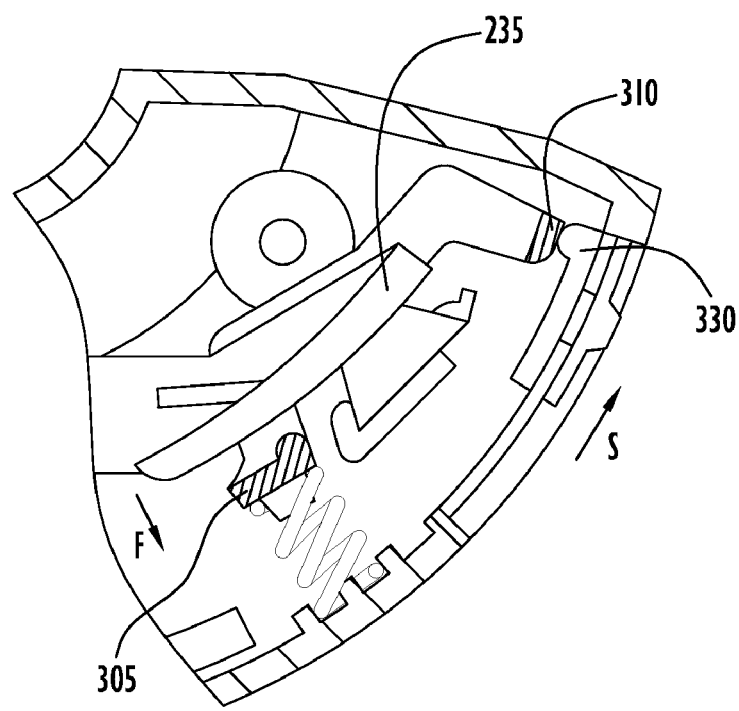

The second actuator 145 of the first housing 100 may be adapted to engage and disengage the lock lever 300 to selectively secure the pendulum at a desired tilt angle. FIGS. 3A and 3B are close-up views of the lock mechanism shown in FIG. 2, with a portion of the lock lever 300 removed for clarity. Specifically, the second actuator 145 may control a ramp 330 that selectively engages the lock lever 300, pivoting it. Referring to FIG. 3A, in operation, the second actuator 145 begins in a first position, in which the biasing member urges the first end 305 of the lock lever 300 against the curved bar 235 of the pendulum 205. When the lock lever 300 engages the pendulum 205, the pendulum is prevented from pivoting about its pivot point P (thus cannot self-level). This, in turn, generally immobilizes the light sources 210A, 210B.

Engaging the second actuator 145 by applying a force (indicated by arrow S) slides the second actuator 145 from the first position to a second position, in which the ramp 330 contacts the second end 310 of the lock lever 300. The ramp 330 drives the second end 310 of the lock lever 300 upward, overcoming the biasing force of the biasing member 320. Thus, the first end 305 of the lock lever 300 is driven downward, away from the pendulum 205 (indicated by arrow F). This releases the pendulum 205, permitting it to freely pivot, leveling the light beams generated by the light sources 210A, 210B.

In this manner, a user may selectively activate the self-leveling feature of the line generating assembly 10. Selectively preventing the movement of the pendulum 205 within to the first housing 100 not only prevents damage to the pendulum 205 during storage and/or transport, but also enables a user to stabilize the light line generated on the work surface (i.e., it prevents the light line from self-leveling). As a result, the line generating assembly 10 may be repositioned on a work surface to project a light line at a desired angle (e.g., a user may establish a zero or datum position, then rotate the assembly 10 at a desired angle from the zero position).

In addition, the lock mechanism is capable of not only securing the pendulum at its normal position (where true vertical and horizontal lines are created), but also securing the pendulum at any degree of tilt throughout the swing of the pendulum. That is, the first end 305 of the lock lever may engage any point of the curved bar 235 as it swings within the first housing 100. Consequently, the pendulum 205 may be stabilized at any position during its swing (e.g., ±6° from its normal (0°) position).

Figure 4A:
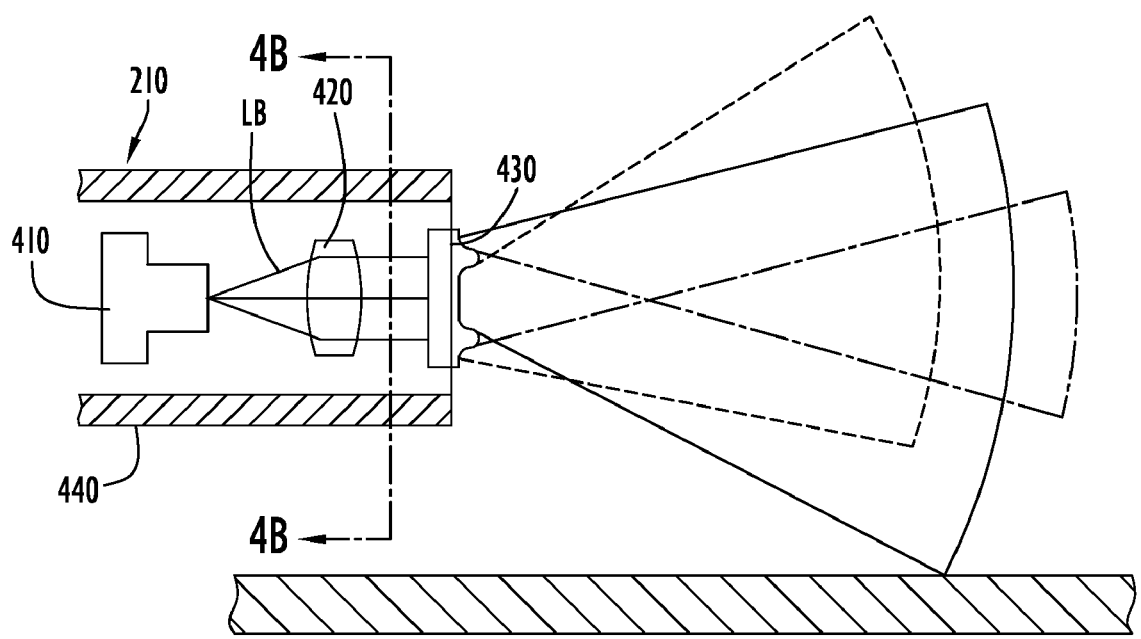
FIGS. 4A-4B illustrate an exemplary laser assembly in accordance with an embodiment of the invention. Specifically.
Figure 4B:
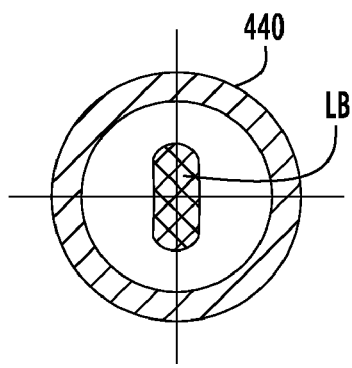

As discussed above, the light sources 210A, 210B of the first housing 100 may include a laser assembly. FIGS. 4A-4B illustrate an exemplary laser assembly in accordance with an embodiment of the invention. FIG. 4A shows a cross sectional view of a laser assembly according to an embodiment of the invention. The laser assembly may include a laser diode 410, a collimating lens 420, and a line lens 430. Each of the laser diode 410, collimating lens 420, and the line lens 430 may be housed in a laser barrel 440. The barrel 440 may possess, but is not limited to, a substantially cylindrical shape. In addition, the barrel 440 may be adjustable to permit its repositioning within the first housing 100.

In operation, the laser diode 410 directs a laser light beam LB through the collimating lens 420. The collimating lens 420 may form the laser light beam LB into a beam having a generally oval cross-section (FIG. 4B), and then the line lens 430 converts the laser light beam LB into a planar beam (i.e., a laser plane). The line lens 430 may possess various shapes to accomplish this purpose. By way of example, the line lens 430 may be a prismatic lens that includes at least two cylindrical lens forms with significantly different focal distances to generate at least two superimposed laser planes with different divergence angles and trajectories. By way of specific example, line lens 430 may be formed from a large-radius, convex lens segment disposed between two small-radius, concave lens segments. As seen best in FIG. 4B, with this configuration, the line lens segment forms three laser light planes superimposed to a single laser light beam onto a surface. The resulting light line is single beam having a symmetrical line pattern that is less intense near the middle and more intense at each end. This ensures the line produced on the support surface is approximately the same when the upper housing is rotated about a vertical axis (discussed in greater detail below). Further details of the laser assembly according to another embodiment of the present invention are disclosed in U.S. Pat. No. 6,914,930 to Raskin et al., the disclosure of which is hereby incorporated by reference in its entirety.

Alternatively or in addition to, either light source 210A, 210B may be associated with a mirror configured to reflect the light beam LB through a window 110A, 110B. The use of mirrors permits a more compact structure. In the embodiment illustrated in FIG. 2, the second light source 210B has a mirror 250 positioned between the collimating lens 420 and the line lens 430. In addition, the mirrors may be adjustable on the pendulum 205 to calibrate the light beam alignment. This can be accomplished with a spring and screw mechanism.

FIG. 5 illustrates a perspective view the line generating assembly 10 of FIG. 1A, showing the operation of the first housing 100. As shown, when the assembly 10 is placed against a support surface (e.g., a vertical surface such as a wall), the first light source 210A transmits a first light beam LB1 (i.e., a laser plane), which forms a first line LL1 on the work surface. Similarly, the second light source 210B transmits a second light beam LB2 in a second direction, creating a second light line LL2 on the work surface. Due to the orientation of the windows 110A, 110B, the first light line LL1 intersects the second light line LL2 proximate the axis of the central aperture 125.

Figure 6:
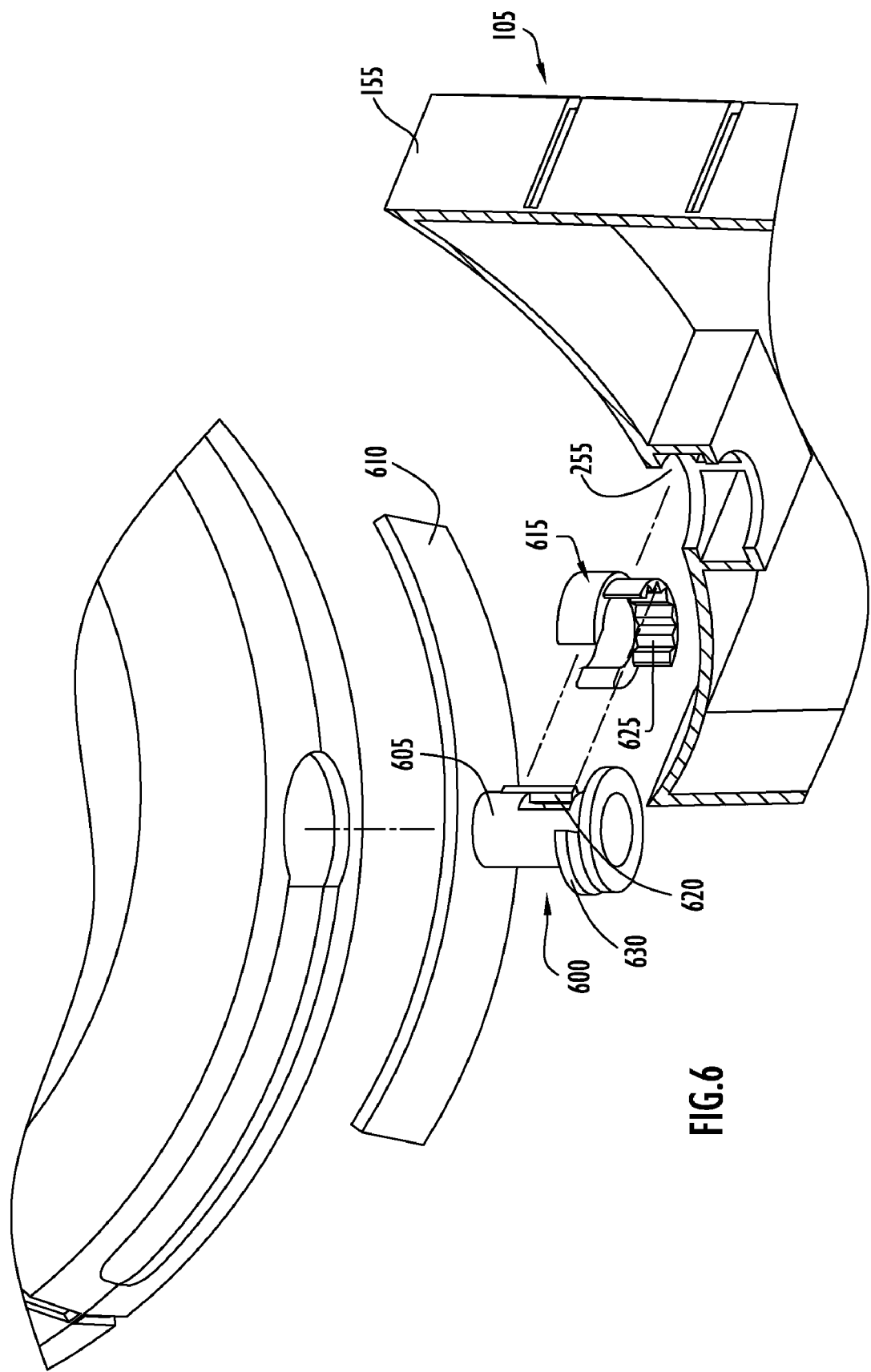
FIG. 6 is an exploded view of the line generating assembly illustrated in FIG. 2, showing the connection between the first housing and the second housing.

The line generating assembly 10 may further be configured such that the first housing 100 may be selectively repositioned with respect to the second housing 105. For example, the first housing 100 may be rotated about an axis extending through the first and second housings. FIG. 6 is an exploded view of the line generating assembly 10 illustrated in FIG. 2, showing the coupling of the first housing 100 to the second housing 105. As shown, a support rod or post 600 may couple the first housing 100 to the second housing 105 such that the post 600 defines a generally vertical axis extending through the first and second housings. The support post 600 may include a shaft 605, a plate 610, and a flange 630. The plate 610 is captured within the first housing 100. Furthermore, a collar 615, fixed to the second housing 105 via a receptacle 255, rotatably receives the shaft 605. Thus, as the first housing 100 rotates, the second housing remains stationary (e.g., in its normal position) while the shaft 605 turns within the collar 615.

Figure 7A:
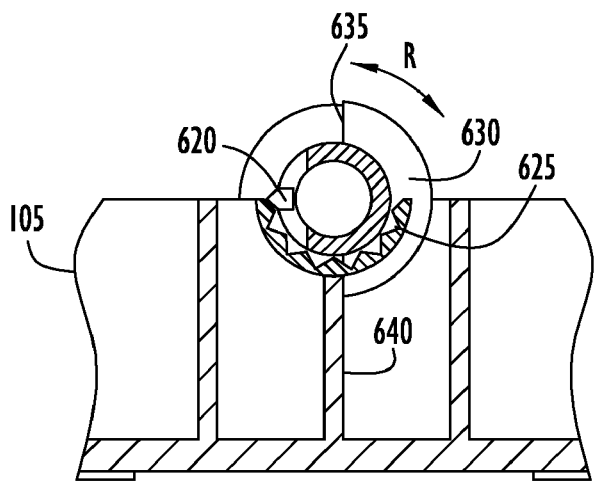
FIGS. 7A-7C are cross-sectional views of the second housing taken along line 7-7 of FIG. 2, showing the detent mechanism of the support post.
Figure 7B:
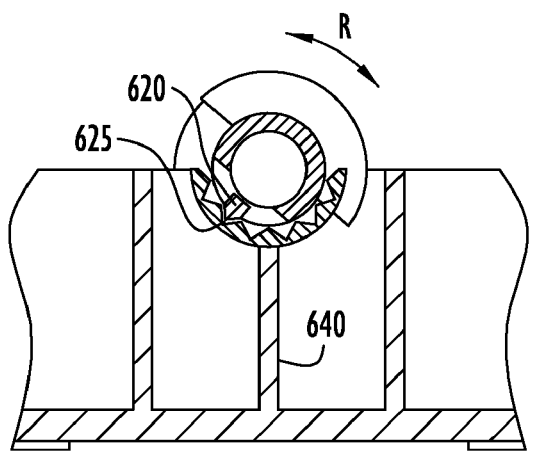
Figure 7C:
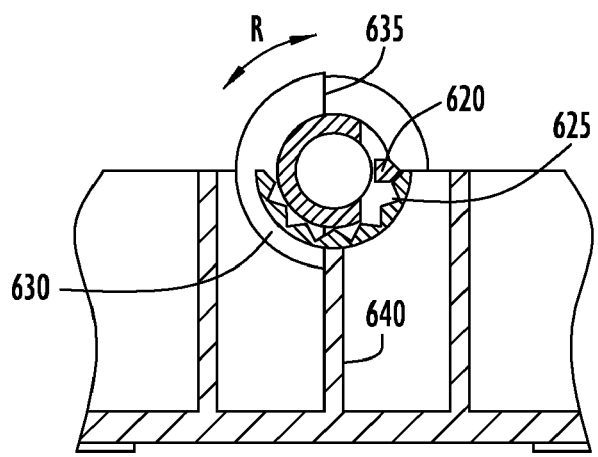

The assembly 10 may further include a detent mechanism to selectively position/fix the first housing 100 with respect to the second housing 105. Specifically, the shaft 605 of the support post 600 may include a resilient tab 620 configured to engage one of a plurality of notches 625 formed in the collar. FIGS. 7A-7C are cross-sectional views of the base taken along line 7-7 of FIG. 2. In operation, beginning in a first position (FIG. 7A), a force may be applied to the first housing 100, rotating the shaft 605 within the collar 615. Referring to FIG. 7B, as the shaft 605 rotates (indicated by arrow R), the resilient tab 620 on the shaft 605 successively engages the notches 625 formed in the collar 615, securing the collar 615 in a desired position.

In this manner, the first housing 100 of the line generating assembly 10 may be rotated about the vertical axis defined by the shaft 605. The degree of rotation may include, but is not limited to, any degree of rotation up to and including 360°. By way of example, the support post 600 may limit the rotation of first housing 100 with respect to the second housing to 180°. Specifically, the shaft 605 of the support post 600 may include a flange 630 with shoulders 635 located 180° apart. The shoulders 635 are configured engage a stop rib 640 located within the second housing 105. Thus, as the shaft 605 is rotated, the shoulder 635 engages the stop rib 640, preventing further rotation of the shaft 605 (seen best in FIGS. 7A and 7C).

Figure 8C:
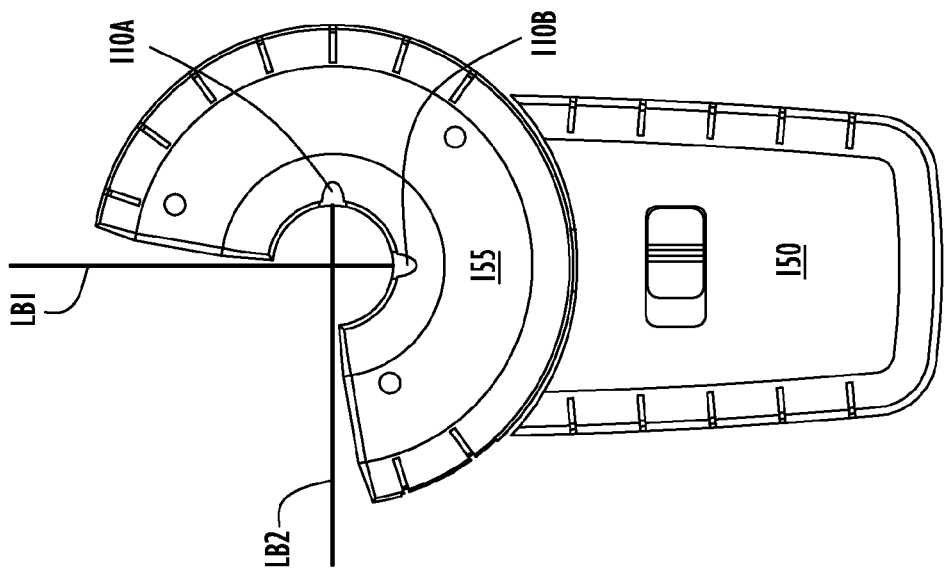
FIGS. 8A, 8B, and 8C are front views of the line generating assembly, showing the rotation of the first housing with respect to the second housing.
Figure 8B:
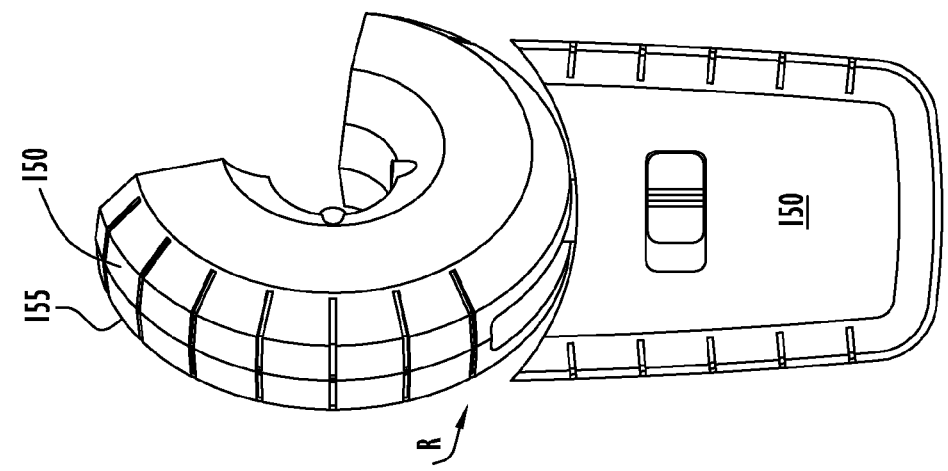
Figure 8A:
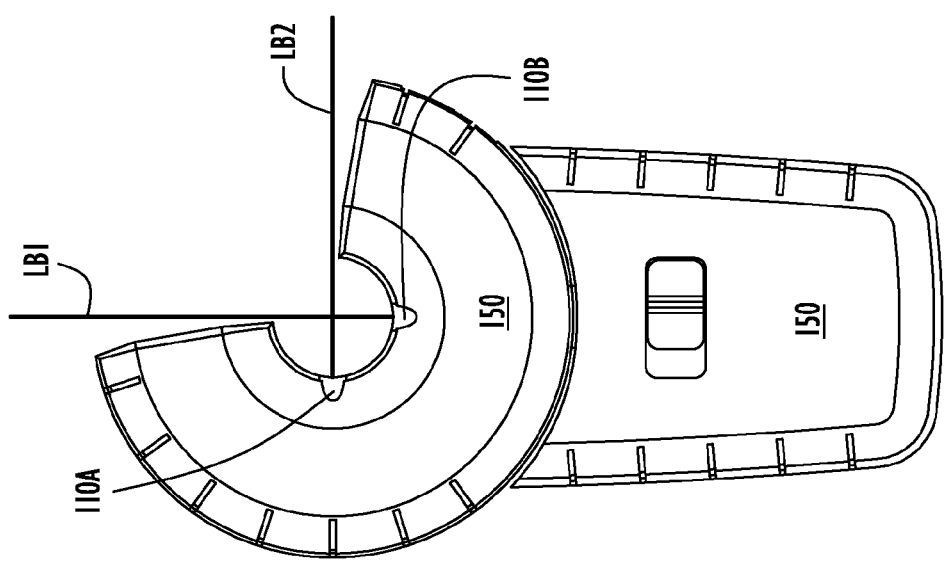

FIGS. 8A, 8B, and 8C are front views of the line generating assembly 10, showing the rotation of the first housing 100 with respect to the second housing 105. With the above described configuration, the line generating unit 100 may be reoriented from a first position to a second position and, as such, enables a user to selectively orient the direction of the light beams LB1, LB2 generated onto the work surface. Referring to FIG. 8A, the first housing 100 begins in a first normal position, in which the first light beam LB1 (transmitted through the first window 110A) is transmitted in a generally horizontal direction, toward the right side of the assembly 10 (from the perspective of FIGS. 8A-8C). Rotating the first housing 100 (indicated by arrow R) reorients the first housing 100 with respect to the second housing 105, moving it from the first normal position to a second normal position, in which the first light beam LB1 (transmitted through the first window 110A) is transmitted in a generally horizontal direction, toward the left side of the assembly 10 (from the perspective of FIGS. 8A-8C). In either the first or second normal positions, the second light beam LB2 (transmitted through the second window 110B) is transmitted in a generally vertical direction. In this manner, the assembly 10 is capable of selectively orienting the direction of the light beams LB1, LB2 onto the work surface (e.g., a generally vertical wall).

Figure 9A:
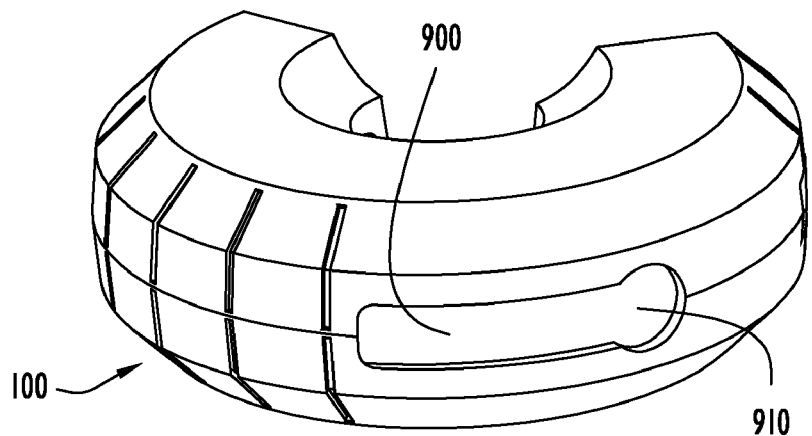
FIGS. 9A-9C illustrate bottom views of the first housing in isolation, showing the sliding of the support post along a slot.
Figure 9B:
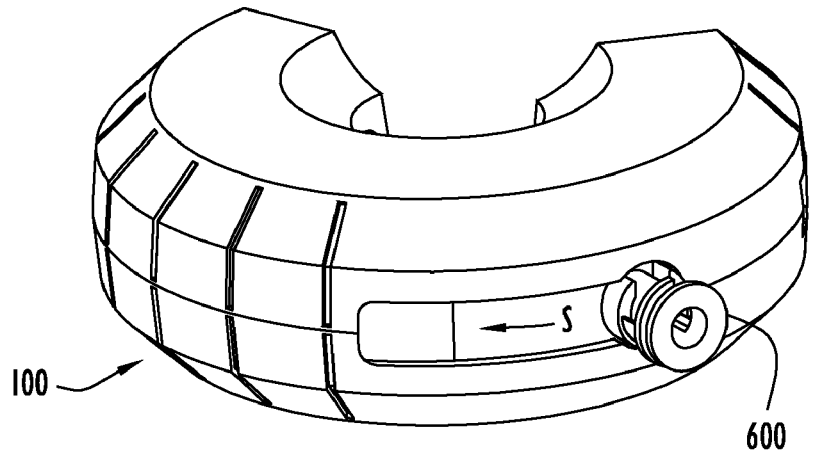
Figure 9C:
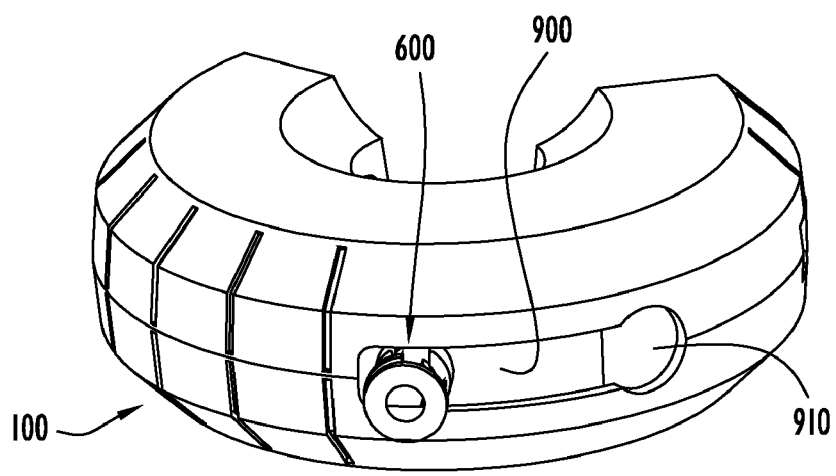

Alternatively or in addition to, the first housing 100 may be adapted to rotate within a plane including or parallel to the second housing 105 (i.e., it may rotate within a plane generally parallel to the surface onto which light line are generated). FIGS. 9A-9C illustrate bottom views of the first housing 100 in isolation. The first housing 100 may include a channel or slot 900 with a keyhole 910. The support post 600 may slide along the slot 900 (indicated by arrow S), permitting the angular pivot of the first housing 100 with respect to the second housing 105. The slot 900 may define a degree of pivot that includes, but is not limited to, about 45°.

Figure 10B:
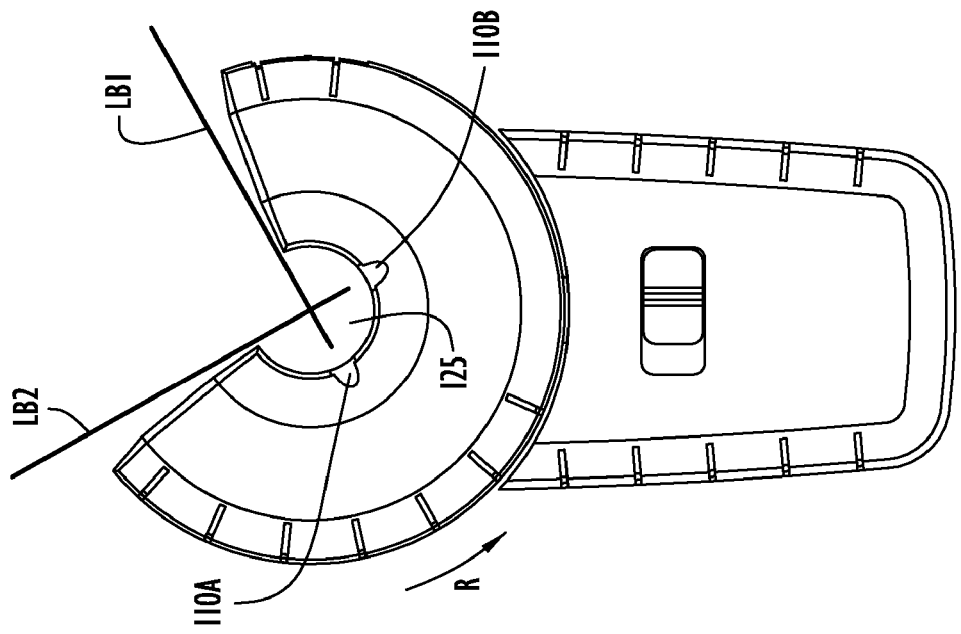
FIGS. 10A and 10B illustrate front views of the line generating assembly, showing the rotation of the first housing within a plane.
Figure 10A:
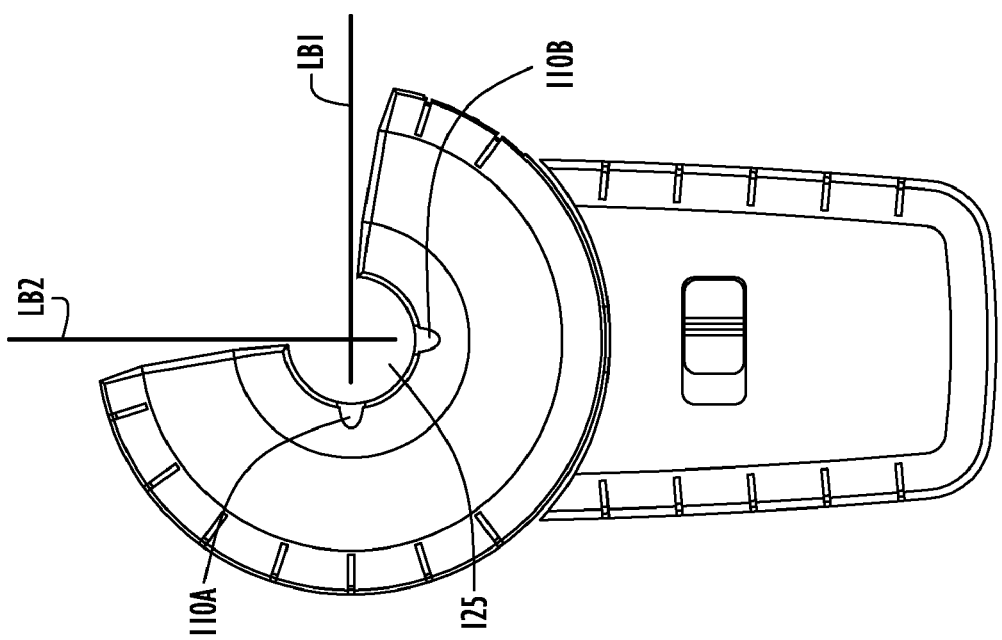

FIGS. 10A and 10B are front views of the line generating assembly 10, showing the pivotal motion of the first housing 100 with respect to the second housing 105. Referring the FIG. 10A, the first housing begins in its first normal position, in which the first light beam LB1 (transmitted through the first window 110A) is transmitted in a generally horizontal direction and/or the second light beam LB2 (transmitted through the second window 110B) is transmitted in a generally vertical direction. At the first normal position, the support post 600 is positioned within the keyhole 910 as described above. Referring to FIG. 10B, applying a force (indicated by arrow R) rotates the first housing 100 from the first normal position, to a second position offset from normal. In the second position, the first light beam LB1 may be directed in a direction offset from the horizontal, and/or the second light beam LB2 may be transmitted in a direction offset from the vertical. In this manner, the first housing 100 rotates about a generally horizontal axis, and specifically about the axis 125 defined by the central aperture of the first housing 100. This enables the rotation of the first housing 100 to alter the "protractor angle" of the light beams LB1, LB2 on the support/work surface.

With the above described configuration, the line generating assembly 10 may be configured to provide two degrees of rotation, e.g., along horizontal and vertical axes, allowing a user to alter the position and direction of light beams on a work surface. In other words, the first housing 100 is capable of moving in a first direction, in which the first housing rotates within a first plane including the second housing 105, and in a second direction, in which the first housing rotates in a second plane generally transverse to the first plane.

Figure 11A:
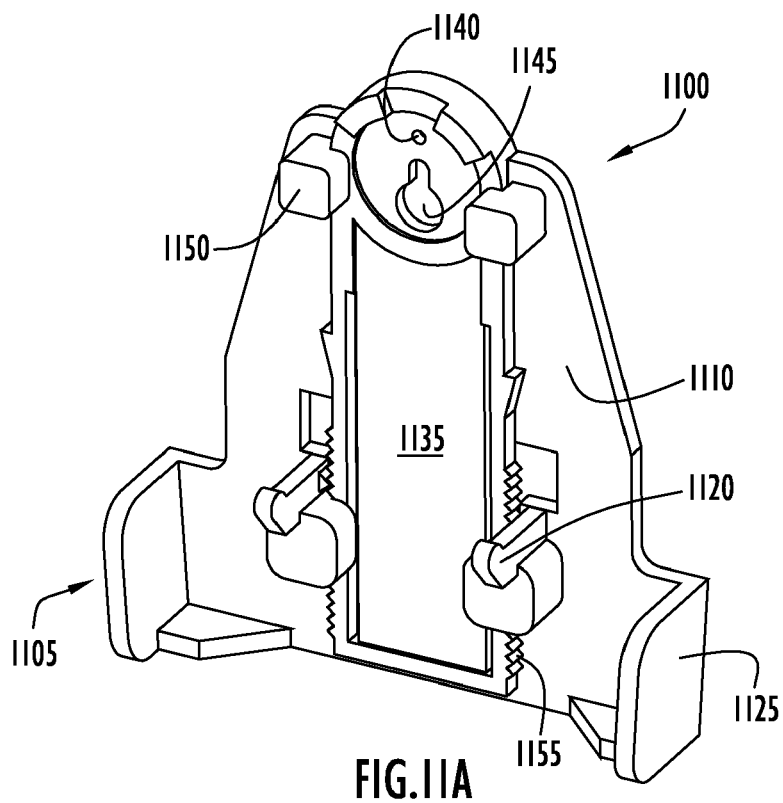
FIGS. 11A and 11B illustrate front and rear perspective views, respectively, of a mounting accessory operable to support the line generating assembly proximate a surface.
Figure 11B:
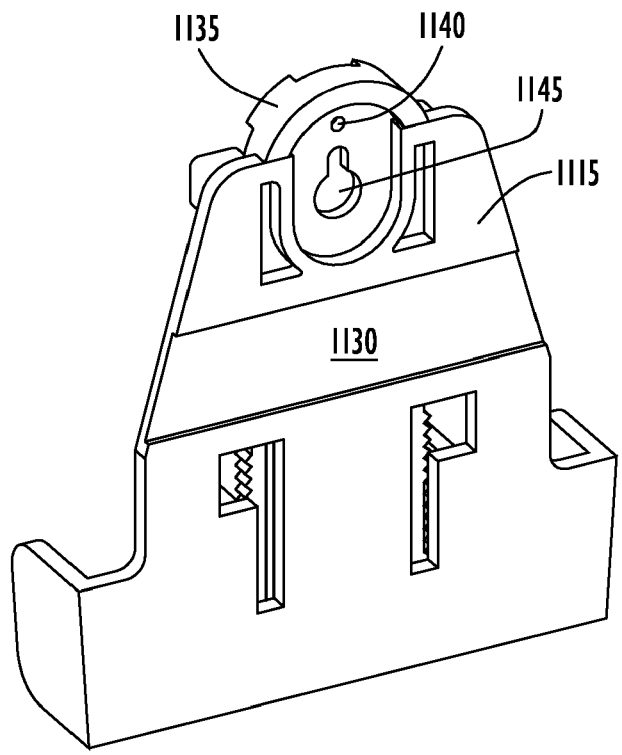

The light line generating device may further be adapted to couple to a support or work surface such as a wall. FIGS. 11A and 11B illustrate front and rear perspective views of a bracket or mounting accessory 1100 operable to support the light line generating device proximate a work surface. The mounting accessory 1100 may include a structure operable to couple to a supporting surface such as a wall or floor. In the illustrated embodiment, the mounting accessory 1100 includes a body 1105 having a first or front surface 1110 and a second or rear surface 1115. The body 1105 may have any shape and/or dimensions suitable for its described purpose. The mounting accessory 1100 may include hooks 1120 that releasably mate with the slots or sockets 160 on the second housing 105 of the light line generating device 10 (as explained above, the sockets 160 may be located on the rear housing portion 155). The mounting accessory 1100 may further include guide members 1125 to align the line generating device 10 onto the accessory.

The mounting accessory 1100 may be adapted to provide multiple modes of attachment. For example, the rear surface 1115 of the body 1105 may include a recess 1130 operable to receive a double sided adhesive strip (adhesive strip not illustrated). The mounting accessory 1100 may further include a plank 1135 with a hole 1140 operable to receive a pointed fastener 1210 (e.g., a pushpin, nail, tack, etc.) that extends through the hole 1140 to engage the work surface and secure the mounting accessory 1100 thereto. The plank 1135 may further include a fastener opening 1145 configured to receive a fastener such as a screw. The fastener opening 1145 may include an aperture adapted to receive a fastener and a conical recess designed to receive the head and shank of the fastener such that it self centers on the conical recess. In operation, once the mounting accessory 1100 is placed in a desired position, a fastener is inserted into the opening 1145 and engages the work surface. The head of the fastener is positioned within the conical recess, supporting the mounting accessory 1100 on the work surface. Additional information regarding the securing mechanisms may be found in U.S. patent application Ser. No. 11/441,451 (Hobden et al.), already incorporated herein by reference in its entirety above.

The plank 1135 of the mounting accessory 1100 may be repositioned with respect to the body 1105. Specifically, the body 1105 may include a plurality of guide rails 1150 along which the plank 1135 moves. The plank may further include teeth 1155 that engage the guide rails 1150, providing a series of detents that secure the plank at a desired height.

Figure 12:
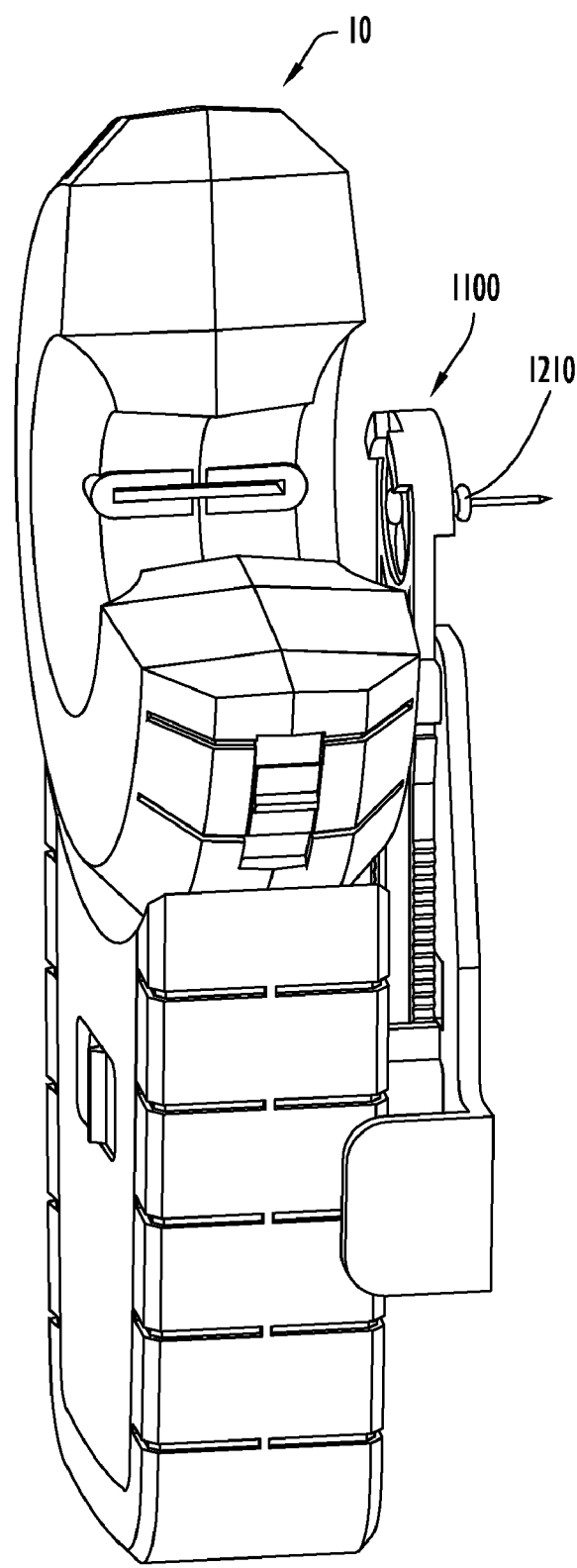
FIG. 12 illustrates the mounting assembly of FIGS. 11A and 11B coupled to the line generating assembly of FIGS. 1A and 1B.

FIG. 12 illustrates a side perspective view of the line generating assembly 10 including the mounting accessory 1100 coupled thereto. In operation, the mounting accessory 1100 is connected to the rear portion 155 of the second housing 105. The hooks 1120 of the mounting accessory 1100 engage the slots 160 of the second housing 105, coupling the line generating assembly 10 to the mounting accessory 1100. A user may then connect the entire assembly 10 to a work surface by placing the mounting accessory 1100 at the desired height, and then inserting a pointed fastener into the hole 1140 or a screw into the opening 1145. The user may further adjust the height of the plank 1135 (e.g., by sliding it up/down) to position the fastener accordingly (e.g., the user can align the fastener with the axis 125 of the first housing 100). The user may then operate the device to generate light lines on the work surface, reorienting the protractor angle and/or the horizon direction of the lines as described above.

While the present invention has been described in detail and with reference to specific embodiments thereof, it will be apparent to one skilled in the art that various changes and modifications can be made therein without departing from the spirit and scope thereof. For example, the first 100 and second housings 105 of the line generating assembly 10 may possess any suitable dimensions, and may be any shape suitable for its described purpose (to house components of the assembly therein). For example, the second housing 105 may include a U-shaped structure. The second housing 105 may be aligned along the same plane as the first housing 100, or may extend at an angle (e.g., an obtuse angle) from the first housing 100. In addition, the light source 210A, 210B may be any source capable of producing a light line on a support or work surface such as a generally vertical wall or a generally horizontal floor.

The number, shape, and/or dimensions of the windows 110A, 110B are not particularly limited to that which is illustrated herein. In addition, the windows 110A, 110B may be angularly spaced about the first housing 100 at any angle suitable for their described purpose. The windows 110A, 110B, moreover, may be sized to prevent the light beam LB1, LB2 from projecting out of the first housing 100 when the pendulum assembly 200 contacts another component disposed within housing 100. Additionally, the windows 110A, 110B, may further prevent the light beams LB1, LB2 from exiting the housing 100 when the pendulum assembly 200 approaches the limits of its angular range. In other words, assuming an angular range being between about −6° to about +6° from normal (i.e., a vertical centerline to where the pendulum assembly 200 self-levels), and where pendulum assembly 200 may travel at any angle beyond this range, the size and/or shape of the windows 110A, 110B may be configured to block the light beams when the pendulum 205 travels beyond about −5° and/or about +5° from normal. This configuration prevents a user from relying on the emitted beam (as substantially horizontal or vertical) when the pendulum has nearly reached or surpassed its range of motion—as the beam may no longer actually represent true plumb or horizon.

The number and positioning of the light sources 210A, 210B is not particularly limited to that which is shown herein. The light sources 210A, 210B may include any structure operable to form a light line a surface. The laser source 410, collimating lens, and/or line lens 430 may be formed into any shape suitable for their described purposes. For example, the collimating lens may be a cylindrical lens operable to convert the laser light beam into light line. The line lens 430, moreover, may possess any shape operable to converts the laser light beam LB into a planar beam (i.e., a laser plane). For example, the line lens 430 may possess a substantially circular cross-section, a generally half-circle cross-section, a generally quarter-circle cross-section, and/or a compound cross-section, which includes a rectangle connected to a quarter-circle.

In addition, the first 140 and/or second actuators 145 may be any actuator suitable for their described purposes, and may include any suitable switch (mechanical press, slide, etc.) and be disposed at any suitable location. The line generating assembly 10 in accordance with the present invention may further include a stud sensor circuit. Information relating to the stud sensor circuitry may be found in U.S. Pat. Nos. 4,099,118 and 4,464,622, the disclosures of which are herein incorporated by reference in their entireties.

The line generating assembly 10 may include a safety mechanism that prevents the rotation of the first housing about the support post 600 when the first housing is not in its normal position. For example, as explained above, the keyhole 910 of channel 900 receives the shaft 605 and collar 615. While in the keyhole 910, the shaft 605 may be rotated as described above. However, when the shaft 605 is positioned along a portion of the channel 900 away from the keyhole (i.e., when the first housing is pivoted offset from normal), the rotation of the first housing 100 may be prevented by the collar 615. This provides a safety mechanism, preventing the rotation of the first housing 100 when it is pivoted to a protractor angle.

The support post 600, which permits the first housing 100 to rotate left-to-right (and vice versa) with respect to the second housing 105, may further include additional stops to limit the rotation of the first housing (e.g. other than about 180 degrees). Similarly, stops may be provided so that the first housing 100 can slide in along the slot 900 and detent at a desired protractor angle (e.g., 0, 45, or 90 degrees).

The mounting accessory 1100 may further include a measurement device operable to measure the protractor angle of the first housing. For example, a 360° protractor may be provided.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

We claim:

1. A light line generating assembly comprising:
   a first housing including:
      a self-leveling pendulum assembly including a pendulum pendulously suspended within the first housing, and
      a first light source coupled to the pendulum, the first light source operable to generate a light beam in a first beam direction, wherein the light beam forms a light line on a surface; and
   a second housing coupled to the first housing,
   wherein the first housing is capable of moving in a first rotary direction, in which the first housing rotates within a first plane including the second housing, and in a second rotary direction, in which the first housing rotates in a second plane generally transverse to the first plane.

2. The light line generating assembly of claim 1, wherein the light source comprises a laser assembly including a laser diode, a collimating lens, and a line lens.

3. The light line generating assembly of claim 1, further comprising a lock mechanism operable to secure the pendulum and prevent its motion.

4. The light line generating assembly of claim 1, wherein the pendulum assembly further comprises a damping mechanism.

5. The light line generating assembly of claim 1, wherein the first housing further includes a second light source configured to generate a second light beam in a second beam direction.

6. The light line generating assembly of claim 5, wherein the first light beam intersects the second light beam at an angle of approximately 90°.

7. The light line generating assembly of claim 5, wherein the second light source is coupled to a self-leveling pendulum assembly.

8. The light beam generating assembly of claim 1, wherein movement of the first housing in the first rotary direction alters the position of the light line generated on the work surface.

9. The light line generating assembly of claim 1, wherein the first housing is capable of rotating approximately 45° in the first rotary direction.

10. The light line generating assembly of claim 9, wherein the first housing is capable of rotating approximately 180° in the second rotary direction.

11. The light line generating assembly of claim 1, wherein the first housing comprises a generally C-shaped structure including:
   a curved body having a first end and a second end defining an opening; and
   an opened channel defined by the body extending transverse to the first plane including the first housing and the second housing.

12. The light line generating assembly of claim 11, wherein:
the first housing further includes a second light source adapted to generate a second light beam in a second beam direction; and
the first light beam and the second light beam intersect at a point within the channel.

13. The light line generating assembly of claim 1 further comprising an attachment device configured to connect the assembly to the work surface.

14. A method of generating a light line on a work surface comprising:
(a) providing a light line generating assembly comprising:
a first housing including a first light source operable to generate a light beam in a first beam direction, wherein the beam of light is capable of forming a light line on a work surface, and wherein the first light source is coupled to a self-leveling pendulum assembly including a pendulum pendulously suspended within the housing; and
a second housing coupled to the first housing,
wherein in the first housing is capable of rotating within a first plane generally parallel to the work surface and in a second plane generally transverse to the work surface;
(b) engaging the work surface with the light line generating assembly;
(c) generating a light line on the work surface; and
(d) rotating the first housing within the first plane to reposition the light line on the work surface.

15. The method of claim 14, further comprising (e) rotating the first housing within the second plane to reposition the light line on the work surface.

16. The method of claim 14, wherein:
(c) comprises (c.1) generating a light line on the work surface such that it travels in a generally vertical direction; and
(d) comprises (d.1) rotating the first housing along the first plane to reposition the light line offset from vertical.

17. The method of claim 14, wherein the first housing further includes second light source configured to generate a second light beam in a second beam direction.

18. A self-leveling, light line generating assembly comprising:
a first housing; and
a second housing comprising:
a pendulum assembly including a pendulum pendulously suspended in second the housing:
a first light source coupled to the pendulum and configured to generate a light beam in a first beam direction,
a second light source coupled to the pendulum and configured to generate a light beam in a second beam direction, and
a lock mechanism operable to prevent the motion of the pendulum within the second housing,
wherein the first housing is coupled to the second housing such that the second housing moves in both a first rotary direction, in which the second housing rotates within a first plane including the first housing, and a second rotary direction, in which the second housing rotates within a second plane generally transverse to the first plane.

19. A light line generating device comprising:
a first housing including a light source operable to generate a light beam in a beam direction, wherein the beam of light is capable of forming a light line on a surface;
a second housing coupled to the first housing; and
a generally vertical axis extending through the first housing and second housing,
wherein in the first housing is capable of moving in a first rotary direction, in which the first housing rotates about the generally vertical axis, and in a second rotary direction, in which the first housing rotates about an axis generally perpendicular to the vertical axis,
and wherein the first housing comprises a generally elongated slot, and the second housing comprises a post slidably captured within the elongated slot to permit movement along the second rotary direction.

20. The light line generating assembly of claim 19, wherein the first housing is capable of rotating approximately 45° in the first rotary direction and rotating approximately 180° in the second rotary direction.

21. The light line generating device of claim 19, wherein:
the first housing includes a pendulum pendulously suspended within the first housing; and
the light source is coupled to the pendulum.

22. A method of generating a light line on a surface comprising:
(a) providing a light line generating device comprising:
a first housing including a light source operable to generate a light beam, wherein the beam of light is capable of forming a light line, and wherein the light source is coupled to a pendulum pendulously suspended within the first housing, and
a second housing coupled to the first housing;
(b) orienting the first housing on a generally vertical work surface;
(c) orienting the light line on the work surface in a first substantially horizontal direction; and
(d) reorienting the first housing to reposition the light line from the first generally horizontal direction to a second substantially horizontal direction,
wherein the first horizontal direction is generally opposed to the second horizontal direction.

23. The method of claim 22, wherein step (d) comprises (d.1) rotating the first housing to reposition the light line from the first generally horizontal direction to the second generally horizontal direction.

24. A light line generating assembly comprising:
a light source housing including a light source operable to generate a light beam capable of forming a light line on a surface, wherein the light source housing comprises a generally C-shaped structure including:
a curved body having a first end and a second end defining an opening, and
an open channel extending along an axis oriented generally transverse to the first plane; and
a base housing coupled to the first housing,
wherein the light source housing is capable of moving in a first direction, in which the light source housing rotates within a first plane including the base housing, and in a second direction, in which the light source housing rotates within a second plane oriented generally transverse to the first plane.

* * * * *